United States Patent
Adair et al.

(10) Patent No.: US 8,150,813 B2
(45) Date of Patent: Apr. 3, 2012

(54) USING RELATIONSHIPS IN CANDIDATE DISCOVERY

(75) Inventors: Gregery G. Adair, Henderson, NV (US); Jeffrey J. Jonas, Las Vegas, NV (US)

(73) Assignee: International Business Machines Corporation, Armonk, NY (US)

(*) Notice: Subject to any disclaimer, the term of this patent is extended or adjusted under 35 U.S.C. 154(b) by 587 days.

(21) Appl. No.: 12/338,552

(22) Filed: Dec. 18, 2008

(65) Prior Publication Data
US 2010/0161566 A1  Jun. 24, 2010

(51) Int. Cl.
*G06F 17/30* (2006.01)
(52) U.S. Cl. .................. 707/692; 707/706
(58) Field of Classification Search .......... 707/692, 707/706, 738, E17.008, 999.1, 999.101
See application file for complete search history.

(56) References Cited

U.S. PATENT DOCUMENTS

| | | | |
|---|---|---|---|
| 5,991,758 A * | 11/1999 | Ellard | 1/1 |
| 6,473,757 B1 | 10/2002 | Garofalakis et al. | |
| 2004/0093331 A1 | 5/2004 | Garner et al. | |
| 2006/0173873 A1 | 8/2006 | Prompt et al. | |
| 2007/0005658 A1 | 1/2007 | Myllymaki | |
| 2007/0179959 A1 | 8/2007 | Sharma et al. | |
| 2008/0243885 A1 * | 10/2008 | Harger et al. | 707/100 |
| 2010/0198756 A1 * | 8/2010 | Zhang et al. | 706/12 |

FOREIGN PATENT DOCUMENTS

| | | |
|---|---|---|
| EP | 1271843 | 1/2003 |
| JP | 2001-306768 | 11/2001 |
| JP | 2005-012738 | 1/2005 |

* cited by examiner

*Primary Examiner* — Mohammad Ali
*Assistant Examiner* — Amanda Willis
(74) *Attorney, Agent, or Firm* — Patterson & Sheridan, LLP

(57) ABSTRACT

Techniques are disclosed for adding entities to a group of entity resolution candidates by selecting entities that have a minimum threshold of similarity to a candidate, allowing a greater number of resolutions in an entity resolution system. To resolve an incoming identity record, an initial group of candidates may be selected from known entities by identifying entities that match a candidate building attribute of the incoming identity record. Additional candidates may be selected by identifying entities with some information that is similar to one of the candidate entities.

21 Claims, 5 Drawing Sheets

USING RELATIONSHIPS IN CANDIDATE DISCOVERY

BACKGROUND OF THE INVENTION

1. Field of the Invention

Embodiments of the invention generally relate to processing identity records in an entity resolution system, and more particularly, to adding entities to a group of entity resolution candidates.

2. Description of the Related Art

In an entity resolution system, identity records are loaded and resolved against known identities to derive a disambiguated entity repository. An "entity" generally refers to an organizational unit used to store identity records that are resolved at a "zero-degree relationship." That is, each identity record associated with a given entity is believed to describe the same person, place, or thing. Thus, one entity may reference multiple individual identities. This is frequently benign, e.g., in a case where an entity includes two identities, a first with identity records identifying a woman based on a familial surname and a second identity with records identifying the same woman based on a married surname. Of course, in other cases, multiple identities may be an indication of mischief or a problem, e.g., in a case where one individual is impersonating another, using a fictitious identify, or engaging in some form of identify theft.

In entity resolution systems, a single entity may have multiple attribute values for the same attribute type. Frequently, this may result from multiple records being provided that include a value for a given attribute. For example, an entity may have multiple addresses, phone numbers, driver's license numbers, names, etc. In some cases, different values for an attribute may be appropriate (e.g., when a person changes telephone numbers or moves from one place to another). Multiple attribute values may also exist due to the variety of systems from which identity records are drawn. Moreover, different record systems may introduce typos, transpose characters, make system-specific alterations, such as truncating an address, or simply format the same information differently.

One task performed by an entity resolution system is to resolve incoming identity records against known identities. In other words, when a new identity record is received, the entity resolution system may determine if the new identity record refers to a known entity. If so, then the new identity record may be associated with that entity. If not, then a new entity may be created for the new identity record.

SUMMARY OF THE INVENTION

One embodiment of the invention includes a method of resolving entities in an entity resolution system storing identity records related to a plurality of entities. The method may generally include receiving a new identity record. identifying a set of candidate entities, from the plurality of entities, based upon a match between an attribute of the new identity record and corresponding attributes of one or more of the plurality of entities. For each entity in the set of candidate entities, a likeness score between a respective entity in the set of candidate entities and each entity in the plurality of entities not included in the set of candidate entities may be determined. The method may also include adding, to the set of candidate entities, each entity in the plurality of entities not included in the set of candidate entities having a likeness score satisfying predefined criteria, relative to one of the entities in the set of candidate entities. In response to determining that the new identity record refers to a particular candidate entity in the set of candidate entities, the new identity record may be associated with that candidate entity.

Still another embodiment of the invention includes a computer program product comprising a computer useable medium having a computer readable program. The computer readable program, when executed on a computer causes the computer to perform an operation for resolving entities in an entity resolution system storing identity records related to a plurality of entities. The operation may generally include receiving a new identity record. identifying a set of candidate entities, from the plurality of entities, based upon a match between an attribute of the new identity record and corresponding attributes of one or more of the plurality of entities. For each entity in the set of candidate entities, a likeness score between a respective entity in the set of candidate entities and each entity in the plurality of entities not included in the set of candidate entities may be determined. The operation may also include adding, to the set of candidate entities, each entity in the plurality of entities not included in the set of candidate entities having a likeness score satisfying predefined criteria, relative to one of the entities in the set of candidate entities. In response to determining that the new identity record refers to a particular candidate entity in the set of candidate entities, the new identity record may be associated with that candidate entity.

Still another embodiment of the invention includes a system having a processor and a memory containing a program, which when executed by the processor, performs an operation for resolving entities in an entity resolution system storing identity records related to a plurality of entities. The operation performed by the program may include performing the steps of receiving a new identity record. identifying a set of candidate entities, from the plurality of entities, based upon a match between an attribute of the new identity record and corresponding attributes of one or more of the plurality of entities. For each entity in the set of candidate entities, a likeness score between a respective entity in the set of candidate entities and each entity in the plurality of entities not included in the set of candidate entities may be determined. The method may also include adding, to the set of candidate entities, each entity in the plurality of entities not included in the set of candidate entities having a likeness score satisfying predefined criteria, relative to one of the entities in the set of candidate entities. In response to determining that the new identity record refers to a particular candidate entity in the set of candidate entities, the new identity record may be associated with that candidate entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
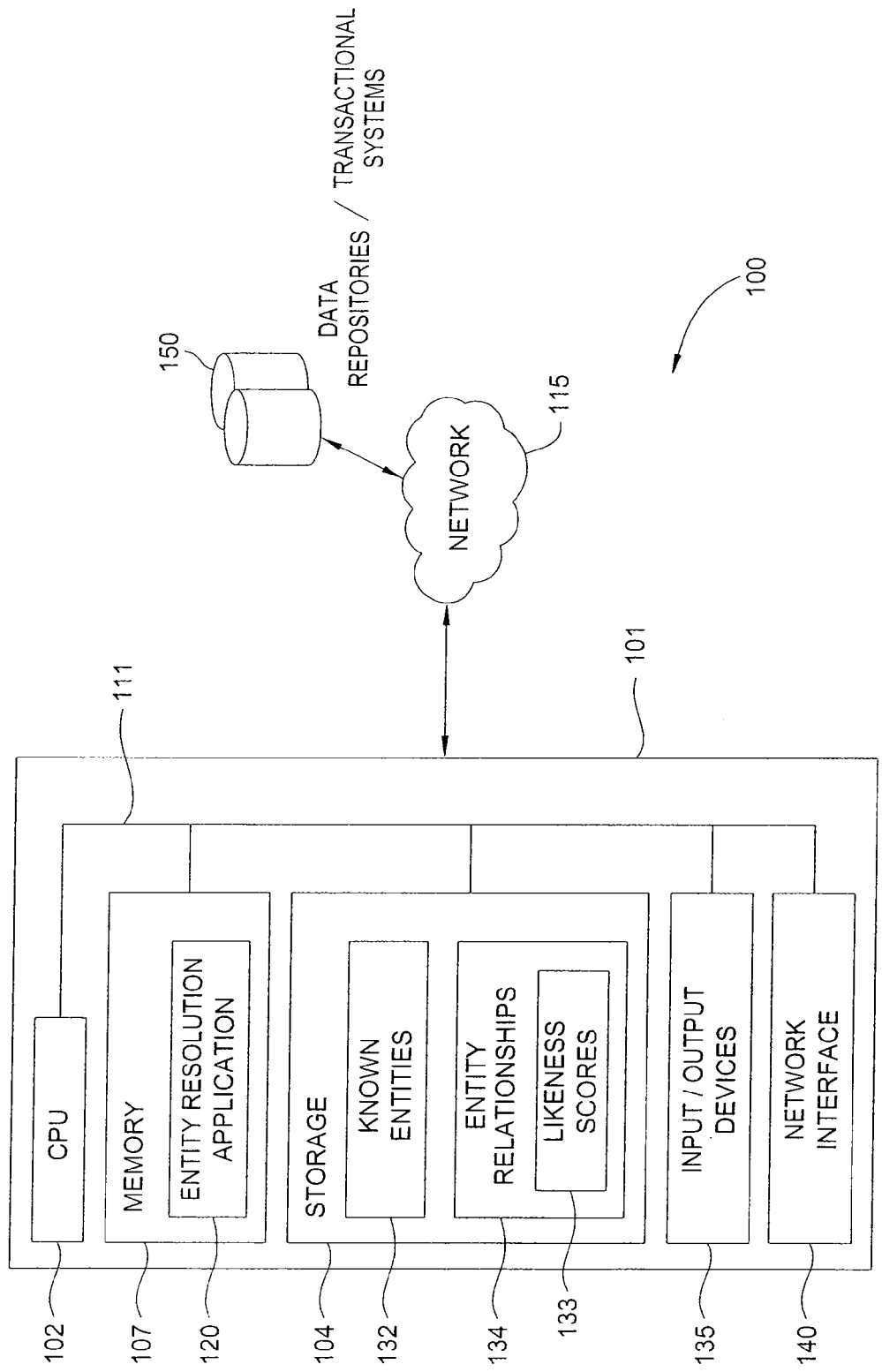
FIG. 1 is a block diagram illustrating a computing environment that includes an entity resolution application, known entities, and likeness scores, according to one embodiment of the invention

Entity resolution systems may store records associated with a large number of entities. The entity resolution system may resolve new identity records against a subset of known entities, referred to as "candidates." The resolution process refers to a process where a new identity record (e.g., a hotel check-record for a given individual) is conjoined with an existing entity (made up of a plurality of individual identities) referencing that individual. The entity resolution process may start through the selection of a set of candidate entities by searching for entities with specific attributes (referred to as candidate building attributes) that match information in the new identity record. For example, if one of the candidate building attributes is a phone number, then entities with a record having that same phone number may be selected as candidate entities.

Once a set of candidates is selected, the entity resolution system may determine whether to associate the new identity record with one of the candidates. That is, whether the incoming record is determined to refer to (or be about) one of the candidate entities. For example, if the new identity record contains the same phone, address, name, and date of birth as a candidate entity, then the new identity record and the candidate likely refer to the same individual. In such a case, the identity record may be conjoined with the candidate entity. Alternatively, if no candidate entity has corroborating attributes then the new record is presumed to refer to a new entity (i.e., to an individual not "known" to the entity resolution system). In such a case, the entity resolution system may create a new entity and associate the new identity record with that entity.

In some cases however, selecting candidates through candidate building attributes does not provide a complete list of high probability candidates (for conjoining) because the candidate building attribute values may not be present on an entity. For example, assume that a phone number is used as a candidate building attribute. If a phone number for an individual has recently changed, then an entity that contains an old phone number may be overlooked as a candidate. Therefore, instead of conjoining the identity record with that entity, an entirely new entity may be created. To include high probability candidates that may otherwise be overlooked, an entity resolution system may use a composite search key composed from two (or more) data types. For example, a last name and a date of birth may used as a composite search key for selecting additional candidates. However, additional configuration steps are needed to implement composite search keys. Moreover, using composite search keys may create a large number of non-relevant candidates. For example, there may be a large number of individuals with a similar last names and birth dates.

Embodiments of the invention provide techniques for adding entities to a group of entity resolution candidates by selecting entities that satisfy predefined criteria (e.g., a minimum threshold of similarity (relationship likeness)), to a candidate itself selected using a candidate building attribute, allowing a greater number of entity resolutions to occur. To resolve an incoming identity record, an initial group of candidates may be selected from known entities by identifying entities that match candidate building attributes of the incoming identity record. Additional candidates may be selected by identifying entities with some information that is similar to the original candidate list. For example, a "likeness score" may be determined between a candidate entity and other entities not selected as candidate entities, based on the candidate building attributes. If the "likeness score" is above a threshold value, than the entity not selected (based on the candidate building attributes) may be added to the set of candidates. Candidates are then compared to the new identity record. If it is determined that the new identity record refers to the same entity as one of the candidates, then the record is conjoined with that candidate. Further, if data ambiguities are remedied due to the conjoining of the record and the candidate, then two or more entities may be conjoined.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable medium may be, for example but not limited to, an electronic, magnetic, optical, electromagnetic, infrared, or semiconductor system, apparatus, device, or propagation medium. More specific examples a computer-readable storage medium include a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Further, computer useable media may also include an electrical connection having one or more wires as well as include optical fibers, and transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating a computing environment 100 with a computer system 101 that includes an entity resolution application 120, known entities 132, entity relationships 134, and likeness scores 133, according to one embodiment of the invention. The computer system 101 is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available. Additionally, computer system 101 includes input/output devices 135 such as a mouse, keyboard and monitor, as well as a network interface 140 used to connect computer system 101 to network 115.

As shown, computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. Computer system 101 may be connected to a data communications network 115 (e.g., a local area network, which itself may be connected to other networks such as the internet). As shown, storage 104 includes a collection of known entities 132, entity relationships 134, and likeness scores. In one embodiment, each known entity 132 stores one or more identity records that are resolved at a "zero-degree relationship." That is, each identity record in a given known entity 132 is believed to describe the same person, place, or thing represented by that known entity 132.

Entity relationships 134 represent identified connections between two (or more) entities. In one embodiment, relationships between entities may be derived from identity records connected (or linked or related) with a first and second entity, e.g., records for the first and second entity sharing and address or phone number. Relationships between entities may also be inferred based on identity records in the first and second entity, e.g., records indicating a role of "employee" for a first entity and a role of "vendor" for a second entity. Relationships may also be based on express statements of relationship, e.g., where an identity record of the first entity directly states a relationship to the second e.g., an identity record listing the name of a spouse, parent, child, or other family relation, as well as other relationships such as the name of a friend or work supervisor. Likeness scores 133 represent a measure of how similar information in one entity is to information in another.

Memory 107 can be one or a combination of memory devices, including random access memory, nonvolatile or backup memory, (e.g., programmable or flash memories, read-only memories, etc.). As shown, memory 107 includes the entity resolution application 120. In one embodiment, the entity resolution application 120 provides a software application configured to resolve inbound identity records received from a set of data repositories and/or transactional systems 150 against candidate entities (selected from known entities 132). Candidates may be selected based upon attributes that match an inbound identity record, referred to as candidate building attributes. Furthermore, entities with likeness scores 133 above a threshold value for one or more of the candidates may be selected as additional candidates for entity resolution.

When an inbound record is determined to reference one (or more) of the known entities 132, the record is then conjoined with that entity 132. Additionally, the entity resolution application 120 may be configured to create relationships 134 (or strengthen or weaken existing relationships) between known entities 132, based on an inbound identity record. For example, the entity resolution application 120 may conjoin two existing entities when a new inbound entity record includes the same name and social security number as one of the known entities 132, and the same name and address as that of another known entity 132. In such a case, the new entity would include the attributes from both existing entities and the new inbound entity.

Illustratively, computing environment 100 also includes the set of data repositories 150. In one embodiment, the data repositories 150 each provide a source of inbound identity records processed by the entity resolution application 120. Examples of data repositories 150 include information from public sources (e.g., telephone directories and/or county assessor records, among others.) And also includes information from private sources, e.g., a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records. Of course, the actual data repositories 150 used by the entity resolution application 120 may be tailored to suit the needs of a particular case, and may include any combination of the above data sources listed above, as well as other data sources. Further, information from data repositories 150 may include transactional systems configured to send records to system 101 in a "push" manner where identity records are actively sent to the entity resolution application 120 as well as in a "pull" manner where the entity resolution application 120 retrieve and/or search for records from data repositories 150.

Figure 2:
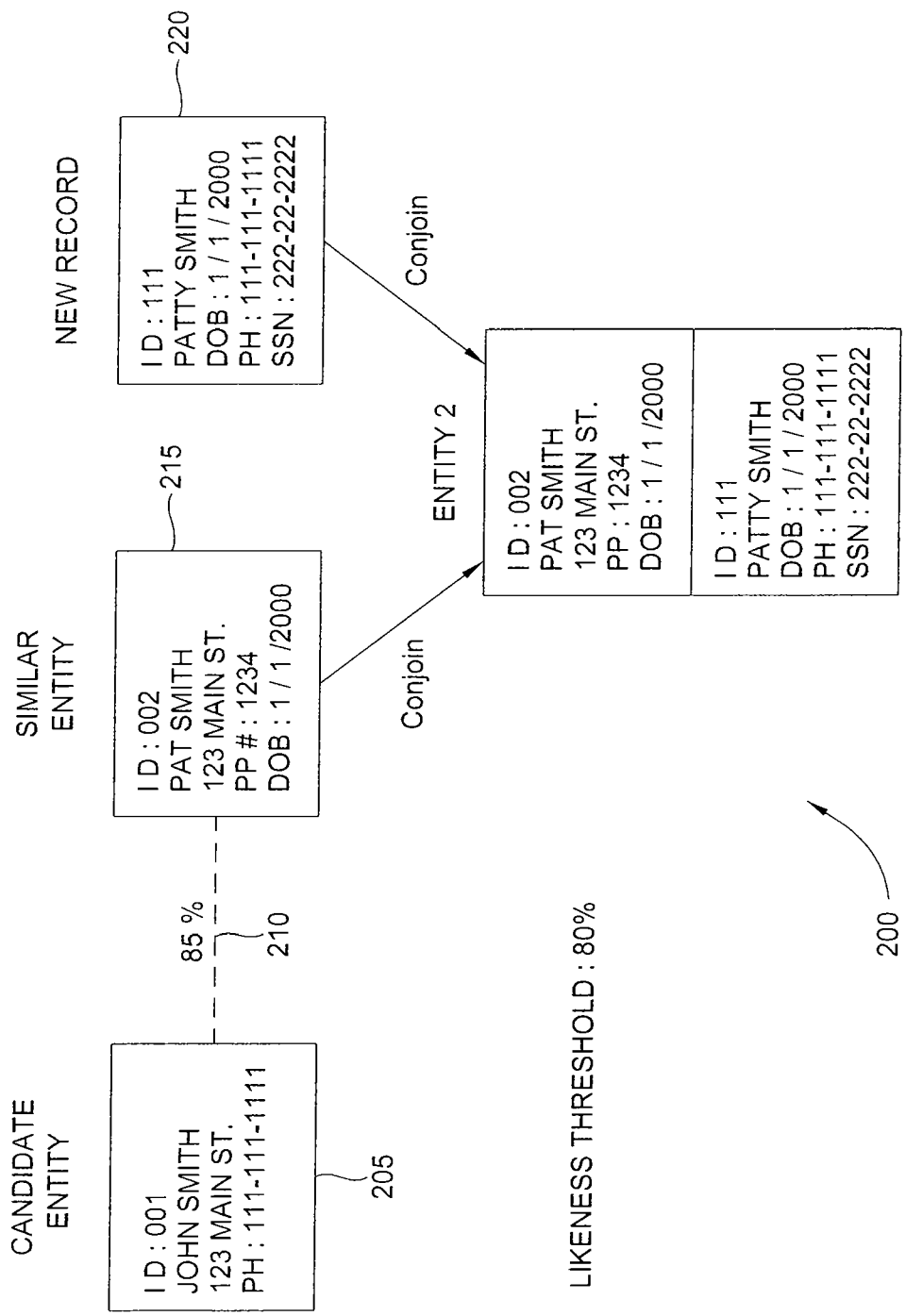
FIG. 2 is a block diagram illustrating a candidate entity being conjoined with a new identity record in an entity resolution system, according to one embodiment of the invention.

FIG. 2 is a block diagram 200 illustrating a new identity record 220 being conjoined with a candidate entity in an entity resolution system, according to one embodiment of the invention. As shown, known entities include a candidate entity 205 and a similar entity 215. In this example, the new record 220 received by the entity resolution application 120 refers to an individual with the name of "Patty Smith." Assume for this example that that phone numbers and addresses are used as candidate building attributes. Candidate entity 205 has a phone number that matches the new record 220, so candidate entity 205 may be selected as a candidate. However, similar entity 215 does not match the new record 220 for either phone number or address. Thus, candidate entity 205 may be selected as a candidate, but similar entity 215 is not selected. Therefore, if entity resolution application 120 lacks access to potential candidate 215, a new entity is created for "patty smith," even though this recorded refers to the same individual as the similar entity 215. However, if entity resolution application 120 determines that a likeness score 210 between the candidate entity 205 and the similar entity 215 exceeds a threshold value, then entity resolution application 120 may include the similar entity 215 as a candidate. In this example, assume the likeness threshold is set to 80 percent and the likeness score 210 between the candidate entity 205 and similar entity 215 is 85% (as measured using the same last names and address values). Therefore, entity resolution application 120 includes the similar entity 215 as a candidate. As the similar entity 215 is included as a candidate, the entity resolution application 120 may determine that the new record 220 should be conjoined with this entity due to the presence of same or similar attributes (date of birth, name, etc.).

Figure 3A:
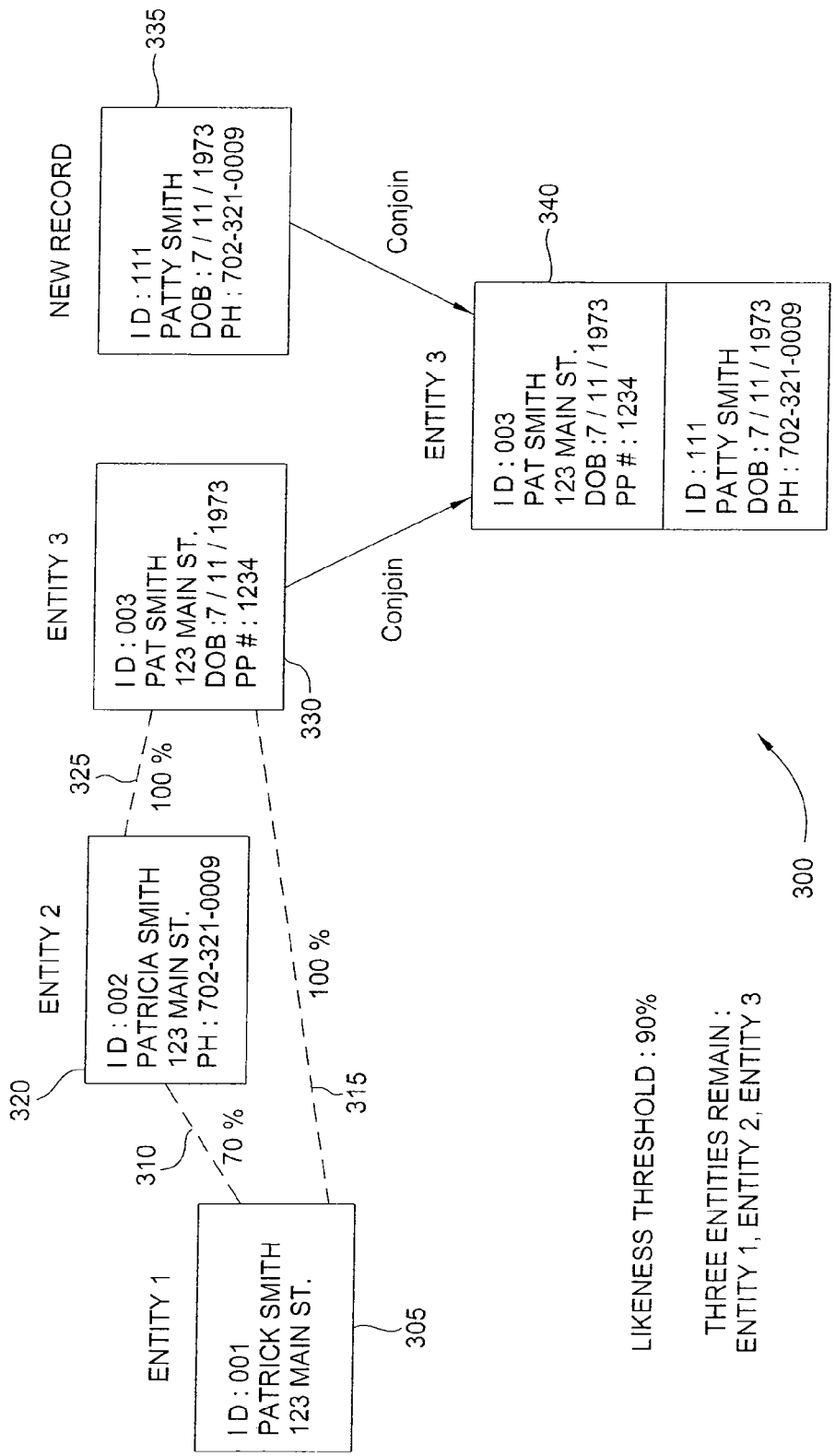
FIGS. 3A and 3B are block diagrams illustrating ambiguous data records being evaluated by an entity resolution system, according to one embodiment of the invention.

FIG. 3A is a block diagram 300 illustrating ambiguous data records being evaluated by an entity resolution system, according to one embodiment of the invention. As shown, known entities 132 includes "Entity 1," 305 "Entity 2" 320, "Entity 3" 330. Further, a new record 335 for Patty Smith has been received by the entity resolution application 120. Assume that phone numbers and addresses are candidate building attributes. Using these candidate building attributes, "Entity 2" 320 is the only candidate selected (as this is the only entity with a matching phone number). In such a case (without adding related entities), entity resolution application 120 may create a fourth entity because the new record 335 does not match "Entity 2" 320.

However, in one embodiment, the entity resolution application 120 may use likeness scores 133 to select additional candidates. In this case, "Entity 1" 305 and "Entity 3" 330 were not selected as candidates based on the phone number being used as a candidate building attribute. However, both "Entity 1" 305 and "Entity 3" 330 may be evaluated to determine a measure of similarity between them and the candidate entity (i.e., "Entity 2" 320). Assume the likeness threshold is 90 percent and the likeness score 310 between "Entity 1" 305 and "Entity 2" 320 is 70 percent, based on having the same last name and address, but different first names normally used for different gendered individuals. Note, since "Pat" may refer to "Patricia" or "Patrick," the name, "Pat," in "Entity 3" 330 is ambiguous data. Assuming a matching name and address result in a 100 percent likeness score, the entity resolution application 120 entity resolution application 120 assigns a likeness score 315 between "Entity 1" 305 and "Entity 3" 330 of 100 percent and likeness score 325 between "Entity 2" 320 and "Entity 3" 330 of 100 percent.

After selecting "Entity 2" 320 as a candidate by matching candidate building attributes, entity resolution application 120 may select "Entity 3" 330 as a candidate because the likeness score 325 between "Entity 3" 330 and "Entity 2" 320 is 100 percent (above the likeness threshold of 90%). Entity resolution application 120 may then conjoin the new record 335 with "Entity 3" 330 if it is determined that the new record 335 belongs to "Entity 3" 330 (e.g., due to the same attribute values, similar attribute values, etc.). As shown, three entities remain: "Entity 1" 305, "Entity 2" 320, and "Entity 3" 340. In another embodiment after "Entity 3" 340 is added as a candidate for having a likeness score 325 greater that the threshold—"Entity 1" 305 could be added as a candidate if it's likeness score is above some additional threshold (e.g., at the second degree of separation this score must be 100%) or all degrees can be explored to the extent the cumulative likeness score does not drop below the set threshold (e.g., in this case 90%).

Figure 3B:
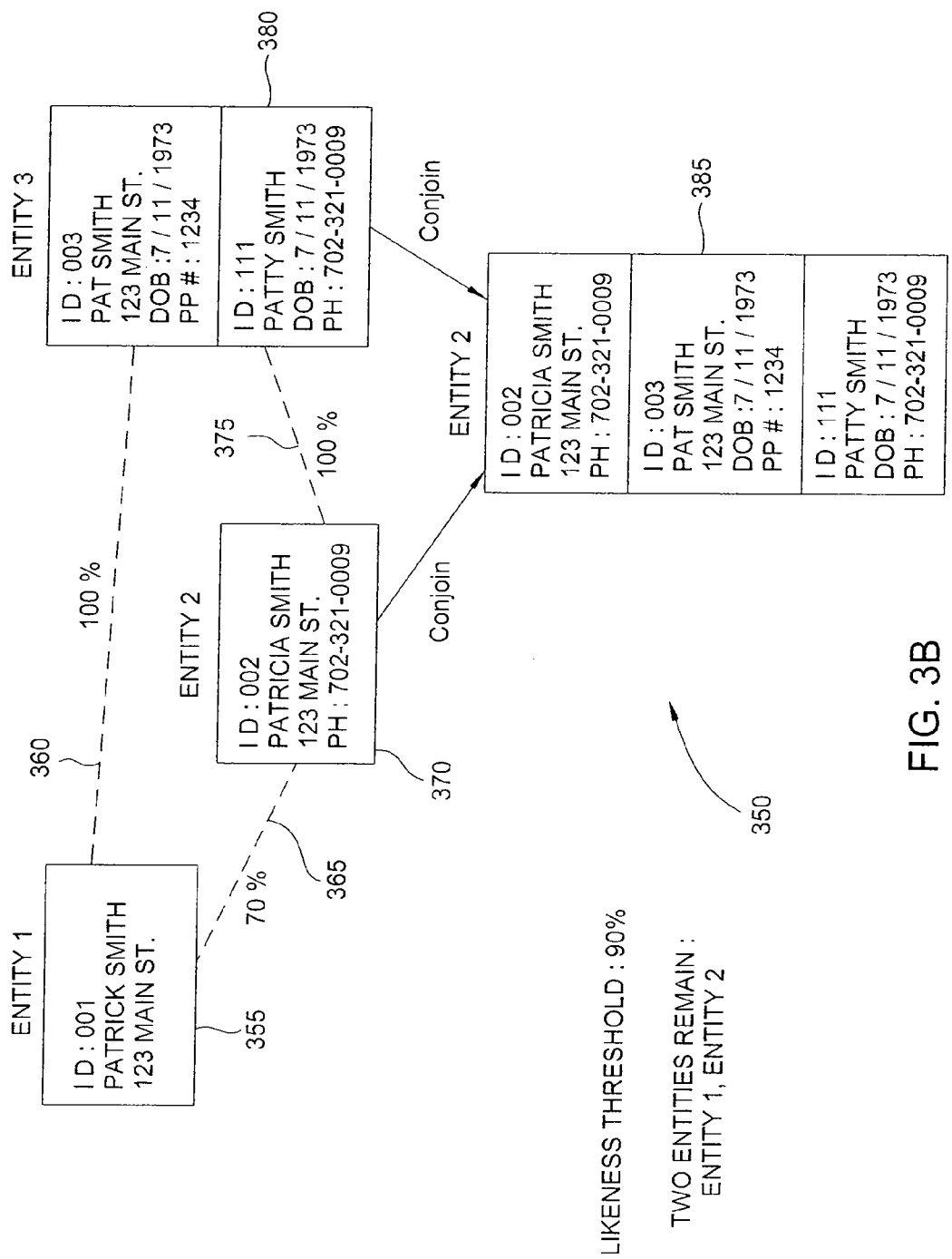

FIG. 3B is a block diagram 350 illustrating two entities being conjoined in an entity resolution system, according to one embodiment of the invention. Once a new identity record has been conjoined with a given entity, entities may themselves be conjoined in cases where the new record resolves an ambiguity in two or more similar entities. As shown, a likeness score 360 between "Entity 1" 355 and "Entity 3" 380 and the likeness score 375 between "Entity 2" 370 and "Entity 3" 380 is at 100%, while the likeness score 365 between "Entity 1" 355 and "Entity 2" 370 remains at 70%. As described above, the ambiguous name, "Pat," matches the male name, "Patrick," as well as the female name, "Patricia." However, entity resolution application 120 may now resolve the ambiguity because the new data added to "Entity 3" 380 contains the name, "Patty." Entity resolution application 120 determines that the gender of "Entity 3" 380 is female, which matches the gender of "Entity 2" 370. Since there is no longer an ambiguity, entity resolution application 120 determines that "Entity 2" 370 and "Entity 3" 380 are the same entity and conjoins them into a new "Entity 2" 385. As shown, two entities remain: "Entity 1" 355 and "Entity 2" 385.

Figure 4:
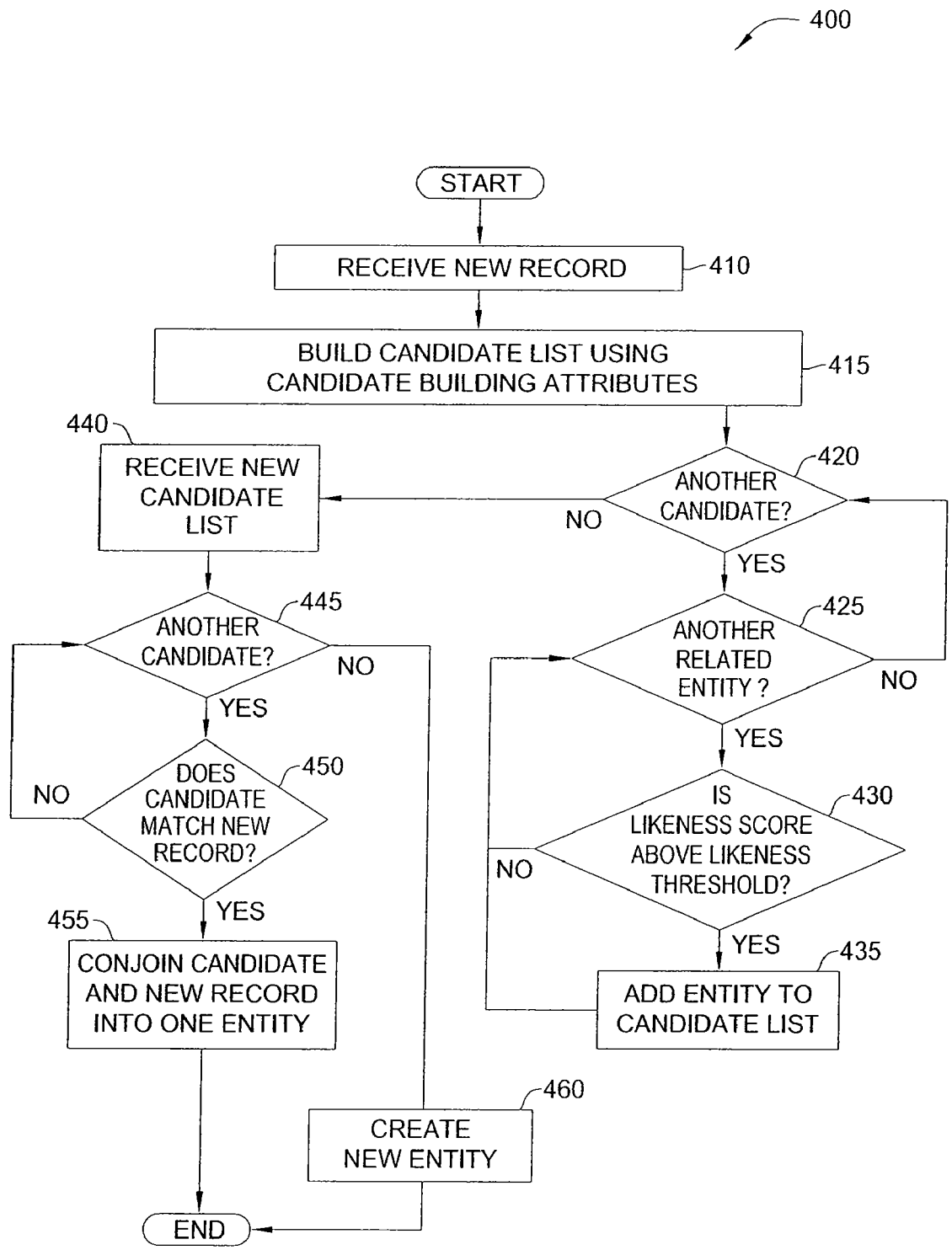
FIG. 4 is a flow diagram illustrating a method for finding and conjoining candidates in an entity resolution system, according to one embodiment of the invention.

FIG. 4 is a flow diagram illustrating a method 400 for finding and conjoining candidates in an entity resolution system, according to one embodiment of the invention. As shown, the method 400 begins at step 410, where the entity resolution application 120 receives a new identity record. At step 415, entity resolution application 120 builds a list of candidates by selecting entities that match candidate building attributes (e.g., phone number, address, etc.) or composite attributes (e.g., last name plus date of birth). In one embodiment, the candidates may be identified from the set of known entities 132

Once the list of candidates is built, a loop that includes steps 420-435 occurs to process each candidate identified by entity resolution application 120. In one embodiment, the entity resolution application 120 evaluates one of the candidates to determine if any of the known entities not selected as a candidate (based on the candidate building attributes) are nevertheless sufficiently similar to one of the candidates. If so, such entities are added to the set of candidates. At step 420, entity resolution application 120 determines whether another candidate remains to be processed. If so, a loop that includes steps 425-435 occurs to process each candidate entity. At step 425, entity resolution application 120 determines whether another related entity remains to be processed. If so, at step 430, entity resolution application 120 determines if a likeness score between the current candidate and the current entity is above a specified likeness threshold. If so, the current entity is added to the list of candidates (step 435) and entity resolution application 120 returns to step 425. However, if the likeness score is below the threshold, then entity resolution application 120 returns to step 425. At step 425, if no more related entities remain to be processed, entity resolution application 120 returns to step 420. At step 420, if no more candidates remain to be processed, entity resolution application 120 proceeds to step 440.

At step 440, entity resolution application 120 receives the candidate list (as augmented by similar entities identified at steps 420-435). At step 445, the entity resolution application 120 determines whether another candidate remains to be processed. If so, at step 450, entity resolution application 120 determines if the current candidate matches the new identity record. In other words, entity resolution application 120 determines whether the new identity record likely refers to the current candidate. If so, at step 455, the entity resolution application 120 adds conjoins the new record with the matching candidate. However, if the entity resolution application 120 determines that the current candidate does not match the identity record at step 450, then the entity resolution application 120 returns to step 445.

At step 445, if no more candidates remain to be processed, the entity resolution application 120 proceeds to step 460, where the entity resolution application 120 determines the new inbound record represents a new entity. One of ordinary skill in the art will recognize that many methods may be used to select a "best matching" candidate from the list of matching candidates. However, if there is no list of matching candidates, then at step 480 a new entity is created. In other words, the entity resolution application 120 creates a new entity and associates the identity record with that entity in cases where no candidate successfully matches the new identity record.

Advantageously, as described above, embodiments of the invention provide techniques for adding entities to a group of candidate entities by selecting entities that have a minimum threshold of similarity to one of the candidate entities. Doing so may allow a greater number of resolutions in an entity resolution system to occur. To resolve an incoming identity record, an initial group of candidates may be selected from known entities by identifying entities that match candidate building attributes of the identity record. Additional candidates may be selected from known entities by identifying entities with a likeness score for a candidate that is above a threshold value. Candidates are then compared to the identity record. If it is determined that the identity record refers to the same entity as the candidate, then the record is conjoined with that candidate. Further, if data ambiguities are removed due to the conjoining of the record and the candidate, then two or more previously existing entities may be conjoined. Thus, a greater number of entity resolutions may occur by including high probability candidates that would not otherwise be considered.

While the foregoing is directed to embodiments of the present invention, other and further embodiments of the invention may be devised without departing from the basic scope thereof, and the scope thereof is determined by the claims that follow.

What is claimed is:

1. A computer-implemented method of resolving entities in an entity resolution system storing identity records related to a plurality of entities, the method comprising:
  receiving a new identity record;
  identifying a set of candidate entities, from the plurality of entities, based upon a match between an attribute of the new identity record and corresponding attributes of one or more of the plurality of entities;
  identifying, from the plurality of entities not included in the set of candidate entities, a set of first-degree entities having a likeness score satisfying a threshold, wherein the likeness score for each first-degree entity is determined relative to a respective candidate entity;
  by operation of one or more processors, identifying, from the plurality of entities not included in the set of candidate entities and not included in the set of first-degree entities, a set of second-degree entities having a likeness score satisfying the threshold, wherein the likeness score for each second-degree entity is determined relative to a respective first-degree entity, wherein the threshold is based on a count of degrees of separation from a respective candidate entity, such that the threshold to be satisfied by the set of second-degree entities is stricter than the threshold to be satisfied by the set of first-degree entities;
  adding, to the set of candidate entities, the set of first-degree entities and the set of second-degree entities; and
  upon determining that the new identity record refers to a candidate entity in the set of candidate entities, including any added entities, conjoining the new identity record and the candidate entity to form a first conjoined entity, wherein the first conjoined entity is further conjoinable with a different entity of the plurality of entities to resolve an instance of data ambiguity.

2. The method of claim 1, further comprising:
upon determining that the new identity record does not refer to any candidate entity, creating a new entity; and conjoining the new identity record with the new entity.

3. The method of claim 1, further comprising:
identifying that conjoining the new identity record and the candidate entity resolves the instance of data ambiguity between two entities, comprising, subsequent to conjoining the new identity record and the candidate entity, determining that the first conjoined entity and the different entity refer to a single individual, wherein the instance of data ambiguity previously prevented the different entity from being conjoined with the candidate entity; and
conjoining the first conjoined entity and the different entity to form a second conjoined entity.

4. The method of claim 1, wherein identifying a set of candidate entities based upon a match between the attribute of the new identity record and a corresponding attribute of one or more of the plurality of entities, comprises:
determining a plurality of attribute values of the new identity record; and
identifying entities associated with identity records matching each of the plurality of attribute values.

5. The method of claim 1, wherein the threshold represents a measure of similarity between entities.

6. The method of claim 1, wherein the attribute of the new identity record and the corresponding attribute of the plurality of entities refers to one of a demographic characteristic, a biographic characteristic, a demographic characteristic, and a biometric of an individual represented by the entity.

7. The method of claim 1, wherein each record in a respective one of the plurality of entities each refers to a same individual.

8. A computer program product comprising a computer useable storage medium having a computer readable program, wherein the computer readable program, when executed on a computer causes the computer to perform an operation for resolving entities in an entity resolution system storing identity records related to a plurality of entities, the operation comprising:
receiving a new identity record;
identifying a set of candidate entities, from the plurality of entities, based upon a match between an attribute of the new identity record and corresponding attributes of one or more of the plurality of entities;
identifying, from the plurality of entities not included in the set of candidate entities, a set of first-degree entities having a likeness score satisfying a threshold, wherein the likeness score for each first-degree entity is determined relative to a respective candidate entity;
by operation of one or more computer processors of the computer when executing the computer readable program, identifying, from the plurality of entities not included in the set of candidate entities and not included in the set of first-degree entities, a set of second-degree entities having a likeness score satisfying the threshold, wherein the likeness score for each second-degree entity is determined relative to a respective first-degree entity, wherein the threshold is based on a count of degrees of separation from a respective candidate entity, such that the threshold to be satisfied by the set of second-degree entities is stricter than the threshold to be satisfied by the set of first-degree entities;
adding, to the set of candidate entities, the set of first-degree entities and the set of second-degree entities; and
upon determining that the new identity record refers to a candidate entity in the set of candidate entities, including any added entities, conjoining the new identity record and the candidate entity to form a first conjoined entity, wherein the first conjoined entity is further conjoinable with a different entity of the plurality of entities to resolve an instance of data ambiguity.

9. The computer program product of claim 8, wherein the operation further comprises:
upon determining that the new identity record does not refer to any candidate entity, creating a new entity; and conjoining the new identity record with the new entity.

10. The computer program product of claim 8, wherein the operation further comprises:
identifying that conjoining the new identity record and the candidate entity resolves the instance of data ambiguity between two entities, comprising, subsequent to conjoining the new identity record and the candidate entity, determining that the first conjoined entity and the different entity refer to a single individual, wherein the instance of data ambiguity previously prevented the different entity from being conjoined with the candidate entity; and
conjoining the first conjoined entity and the different entity to form a second conjoined entity.

11. The computer program product of claim 8, wherein identifying a set of candidate entities based upon a match between the attribute of the new identity record and a corresponding attribute of one or more of the plurality of entities, comprises:
determining a plurality of attribute values of the new identity record; and
identifying entities associated with identity records matching each of the plurality of attribute values.

12. The computer program product of claim 8, wherein the threshold represents a measure of similarity between entities.

13. The computer program product of claim 8, wherein the attribute of the new identity record and the corresponding attribute of the plurality of entities refers to one of a demographic characteristic, a biographic characteristic, a demographic characteristic, and a biometric of an individual represented by the entity.

14. The computer program product of claim 8, wherein each record in a respective one of the plurality of entities each refers to a same individual.

15. A system, comprising:
one or more computer processors; and
a memory containing a program, which when executed by the one or more computer processors, performs an operation for resolving entities in an entity resolution system storing identity records related to a plurality of entities by performing the steps of:
receiving a new identity record;
identifying a set of candidate entities, from the plurality of entities, based upon a match between an attribute of the new identity record and corresponding attributes of one or more of the plurality of entities;
identifying, from the plurality of entities not included in the set of candidate entities, a set of first-degree entities having a likeness score satisfying a threshold, wherein the likeness score for each first-degree entity is determined relative to a respective candidate entity;
identifying, from the plurality of entities not included in the set of candidate entities and not included in the set of first-degree entities, a set of second-degree entities having a likeness score satisfying the threshold, wherein the likeness score for each second-degree entity is determined relative to a respective first-degree entity, wherein the threshold is based on a count of degrees of separation from a respective candidate entity, such that the threshold to be satisfied by the set of second-degree entities is stricter than the threshold to be satisfied by the set of first-degree entities;

adding, to the set of candidate entities, the set of first-degree entities and the set of second-degree entities; and upon determining that the new identity record refers to a candidate entity in the set of candidate entities, including any added entities, conjoining the new identity record and the candidate entity to form a first conjoined entity, wherein the first conjoined entity is further conjoinable with a different entity of the plurality of entities to resolve an instance of data ambiguity.

16. The system of claim 15, wherein the steps further comprise:

upon determining that the new identity record does not refer to any candidate entity, creating a new entity; and conjoining the new identity record with the new entity.

17. The system of claim 15, wherein the steps further comprise:

identifying that conjoining the new identity record and the candidate entity resolves the instance of data ambiguity between two entities, comprising, subsequent to conjoining the new identity record and the candidate entity, determining that the first conjoined entity and the different entity refer to a single individual, wherein the instance of data ambiguity previously prevented the different entity from being conjoined with the candidate entity; and conjoining the first conjoined entity and the different entity to form a second conjoined entity.

18. The system of claim 15, wherein identifying a set of candidate entities based upon a match between the attribute of the new identity record and a corresponding attribute of one or more of the plurality of entities, comprises:

determining a plurality of attribute values of the new identity record; and identifying entities associated with identity records matching each of the plurality of attribute values.

19. The system of claim 15, wherein the threshold represents a measure of similarity between entities.

20. The system of claim 15, wherein the attribute of the new identity record and the corresponding attribute of the plurality of entities refers to one of a demographic characteristic, a biographic characteristic, a demographic characteristic, and a biometric of an individual represented by the entity.

21. The system of claim 15, wherein each record in a respective one of the plurality of entities each refers to a same individual.

* * * * *